US011275247B2

United States Patent
Shin et al.

(10) Patent No.: US 11,275,247 B2
(45) Date of Patent: Mar. 15, 2022

(54) ELECTRONIC DEVICE

(71) Applicant: LG ELECTRONICS INC., Seoul (KR)

(72) Inventors: Seungyong Shin, Seoul (KR); Sungchul Shin, Seoul (KR); Dongyoung Lee, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 16/593,684

(22) Filed: Oct. 4, 2019

(65) Prior Publication Data

US 2021/0063636 A1 Mar. 4, 2021

(30) Foreign Application Priority Data

Aug. 30, 2019 (KR) .................. 10-2019-0107572

(51) Int. Cl.
    *G02B 27/01* (2006.01)
    *G02B 27/00* (2006.01)
    *F21V 8/00* (2006.01)
    *G02B 6/10* (2006.01)
    *G06T 19/00* (2011.01)

(52) U.S. Cl.
    CPC ......... *G02B 27/0172* (2013.01); *G02B 6/003* (2013.01); *G02B 6/0028* (2013.01); *G02B 27/0081* (2013.01); *G02B 6/10* (2013.01); *G02B 2027/0125* (2013.01); *G02B 2027/0178* (2013.01); *G06T 19/006* (2013.01)

(58) Field of Classification Search
None
See application file for complete search history.

(56) References Cited

U.S. PATENT DOCUMENTS

| | | |
|---|---|---|
| 2017/0227764 A1 | 8/2017 | Kim et al. |
| 2017/0293141 A1 | 10/2017 | Schowengerdt et al. |
| 2019/0204600 A1 | 7/2019 | Ha et al. |
| 2019/0204601 A1 | 7/2019 | Ha et al. |

FOREIGN PATENT DOCUMENTS

CN      105044925      7/2017

OTHER PUBLICATIONS

PCT International Application No. PCT/KR2019/012046, International Search Report dated Sep. 18, 2019, 3 pages.

*Primary Examiner* — Jerry Rahll

(74) *Attorney, Agent, or Firm* — Lee, Hong, Degerman, Kang & Waimey PC

(57) ABSTRACT

Disclosed is an electronic device implementing a pin mirror-type display to address a double image problem, the electronic device including: a plate-shaped optical element forming an inner side surface directed toward a user's eyes and an outer side surface opposite to the inner side surface; an optical driving assembly allowing image light to be incident on one side in a lengthwise direction of the optical element; a reflection member provided on the other side in the lengthwise direction of the optical element so that the incident image light travels along an inside of the optical element; and a pin mirror member reflecting the reflected image light toward the reflection member to make a depth of field (DOF) deep, and disposed between a point at which the image light is incident from the optical element and a point at which the image light is reflected in the reflection member.

18 Claims, 25 Drawing Sheets

(a)

(b)

(a)

(b)

(c)

(d)

(e)

(f)

(a)

(b)

(c)

(d)

(a)

(b)

(c)

(d)

(a)

(b)

(c)

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0107572, filed on Aug. 30, 2019, the contents of which are hereby incorporated by reference herein in its entirety.

BACKGROUND OF THE INVENTION

Field of the Invention

The present disclosure relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

Such an electronic device is implemented by an optical driving assembly and a display. The optical driving assembly forms and provides an image light corresponding to a content, and the display receives the formed image light and output the image light so that a user can recognize the image light.

This type of electronic device is to be put on a head, and a user can generally use the electronic device while moving, and therefore, the electronic device needs to have a high level of portability. For this reason, the electronic device is required to be compact and lightweight.

Meanwhile, in a case wherein the display is realized as a pin mirror type, the pin mirror is provided in size smaller than a pupil in an optical element to thereby extend a depth of field (DOF). The pin mirror is provided in an optical element, and, in a case where the optical element is made compact according to the above-described requirement, a sufficient distance from the optical driving assembly for emitting image light to the pin mirror may not be ensured.

This optical system condition may cause a problem such as failure of ensuring a DOF, and accordingly, an image cannot be formed clearly.

SUMMARY OF THE INVENTION

The present disclosure provides an electronic device used for Virtual Reality (VR), Augmented Reality (AR), and Mixed Reality (MR).

The present invention aims to address a double image problem that occurs in an electronic device having a pin mirror-type display unit, as described above.

According to an aspect of the present disclosure to achieve the above or another object, an electronic device comprising, a plate-shaped optical element forming an inner side surface directed toward a user's eyes and an outer side surface opposite to the inner side surface, an optical driving assembly allowing image light to be incident on one side in a lengthwise direction of the optical element, a reflection member provided on the other side in the lengthwise direction of the optical element so that the incident image light travels along an inside of the optical element; and a pin mirror member reflecting the reflected image light by the reflection member to extend a depth of field (DOF), and disposed between a point at which the image light is incident from the optical element and a point at which the image light is reflected in the reflection member is provided.

Further, according to another aspect of the present disclosure, the electronic device wherein the optical element further comprises the other side collection surface that connects the inner side surface and the outer side surface, and wherein the reflection member comprises a reflective surface in a shape identical to a shape of at least one partial area of the other side connection surface is provided.

Further, according to another aspect of the present disclosure, the electronic device wherein the reflection member is laminated or printed on the at least a partial area of the other side connection surface is provided.

Further, according to another aspect of the present disclosure, the electronic device wherein a reflective surface of the pin mirror member is directed toward the reflection member and the inner side surface is provided.

Further, according to another aspect of the present disclosure, the electronic device wherein the reflection member comprises a flat area is provided.

Further, according to another aspect of the present disclosure, the electronic device wherein the image light is totally reflected between the inner side surface and the outer side surface of the optical element and then arrives at the reflection member, and wherein the reflection member forms a surface inclined obliquely with respect to the inner side surface or the outer side surface of the optical element is provided.

Further, according to another aspect of the present disclosure, the electronic device wherein the image light arrives at the reflection member without being totally reflected by the inner side surface and the outer side surface of the optical element, and wherein the reflection member forms a surface vertical to the inner side surface and the outer side surface of the optical element is provided.

Further, according to another aspect of the present disclosure, the electronic device wherein the reflection member comprises a curved area and is provided such that a concave surface is directed toward an inside of the optical element is provided.

Further, according to another aspect of the present disclosure, the electronic device wherein the curved area of the reflection member is formed in the other surface connection surface that connects the inner side surface and the outer side surface of the optical element is provided.

Further, according to another aspect of the present disclosure, the electronic device wherein the curved area of the reflection member is provided inside the other side of the optical element is provided.

Further, according to another aspect of the present disclosure, the electronic device wherein the reflection member is a retro-reflector element is provided.

Further, according to another aspect of the present disclosure, the electronic device wherein a reflective surface of the retro-reflector element comprises a flat surface and is vertical to the inner side surface and the outer side surface of the optical element.

Further, according to another aspect of the present disclosure, the electronic device further comprising a diffraction element which is provided in one side of the optical element, and at which the image light incident from the optical driving assembly first arrives to diffract the arrived image light so that the image light is totally reflected between the inner side surface and the outer side surface of the optical element is provided.

Further, according to another aspect of the present disclosure, the electronic device wherein the inner side surface and the outer side surface are parallel to each other, and wherein one side connection surface, connecting the inner side surface and one side of the outer side surface, and the other side connection surface, connecting the inner side surface and the other side of the outer side surface, are all vertical to the inner side surface or the outer side surface is provided.

Further, according to another aspect of the present disclosure, the electronic device further comprising an auxiliary reflection member which is provided in one side connection surface connecting the inner side surface and one side of the outer side surface, and at which the image light incident from the optical driving assembly first arrives to reflect the arrived image light so that the image light is totally reflected between the inner side surface and the outer side surface of the optical element is provided.

DESCRIPTION OF EXEMPLARY EMBODIMENTS

Figure 1:
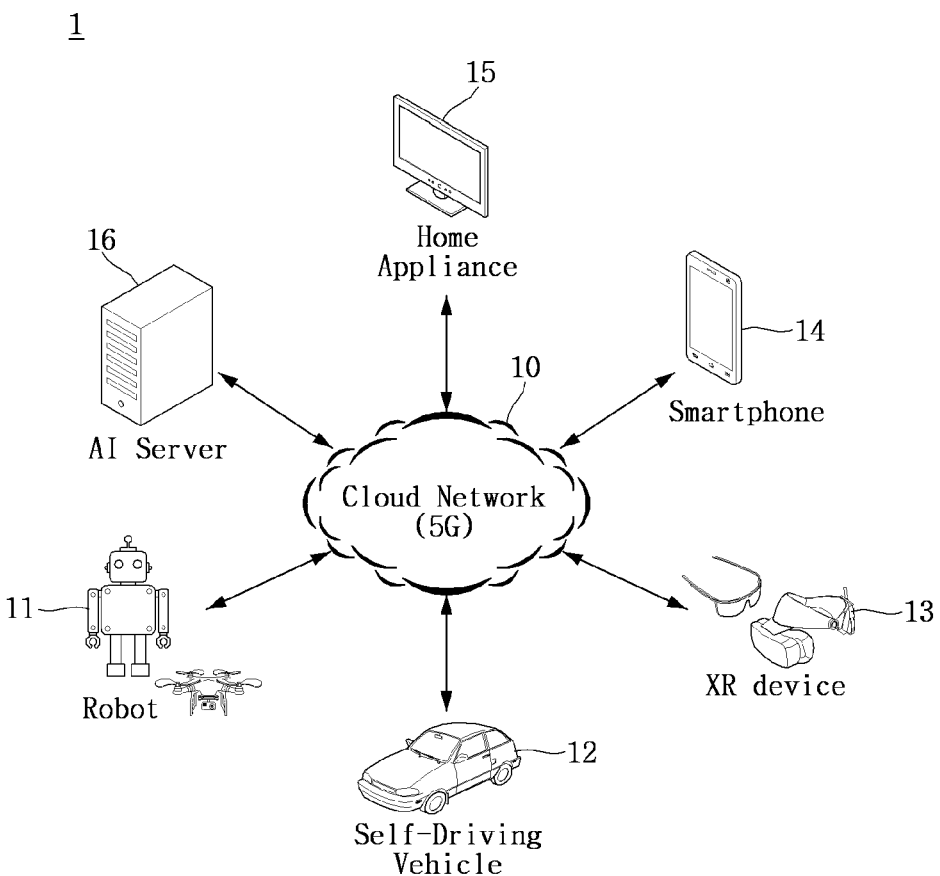
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+Xr>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

Figure 2:
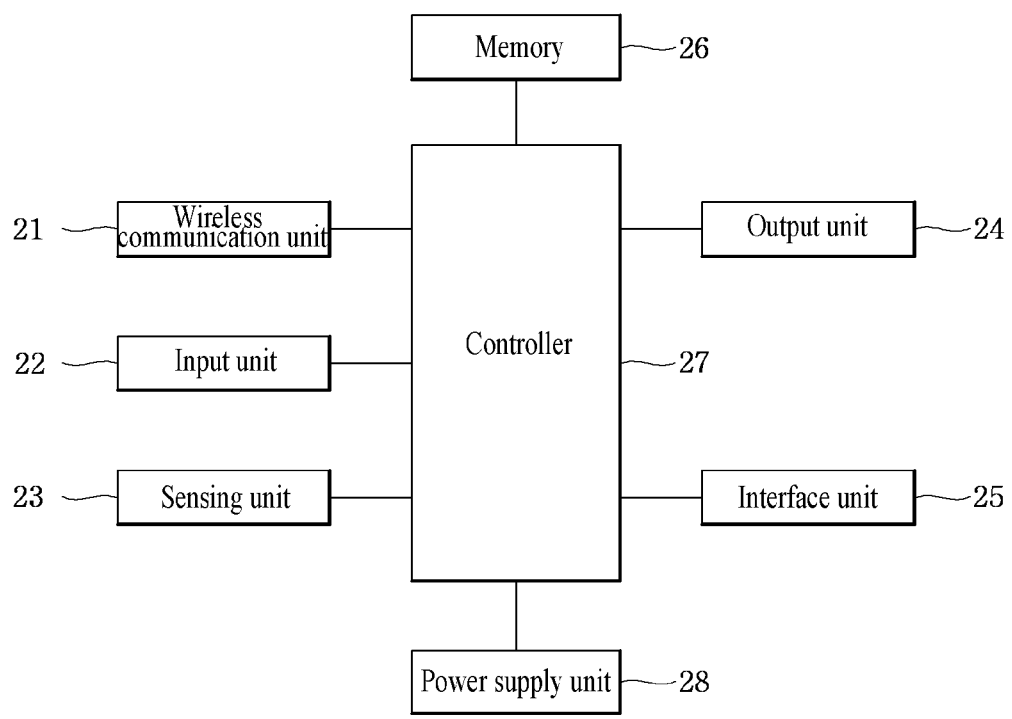
FIG. 2 is a block diagram illustrating the structure of an eXtended Reality (XR) electronic device according to one embodiment of the present disclosure.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display, sound output unit, haptic module, and optical output unit. The display may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
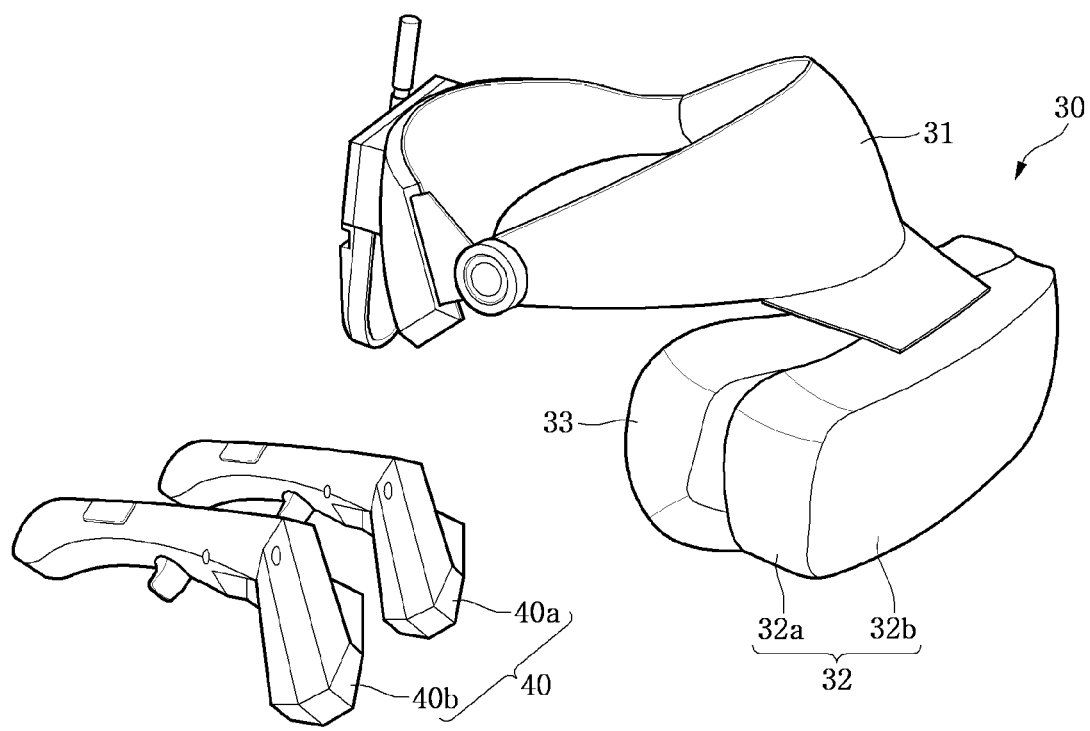
FIG. 3 is a perspective view of a VR electronic device according to one embodiment of the present disclosure.
Figure 4:
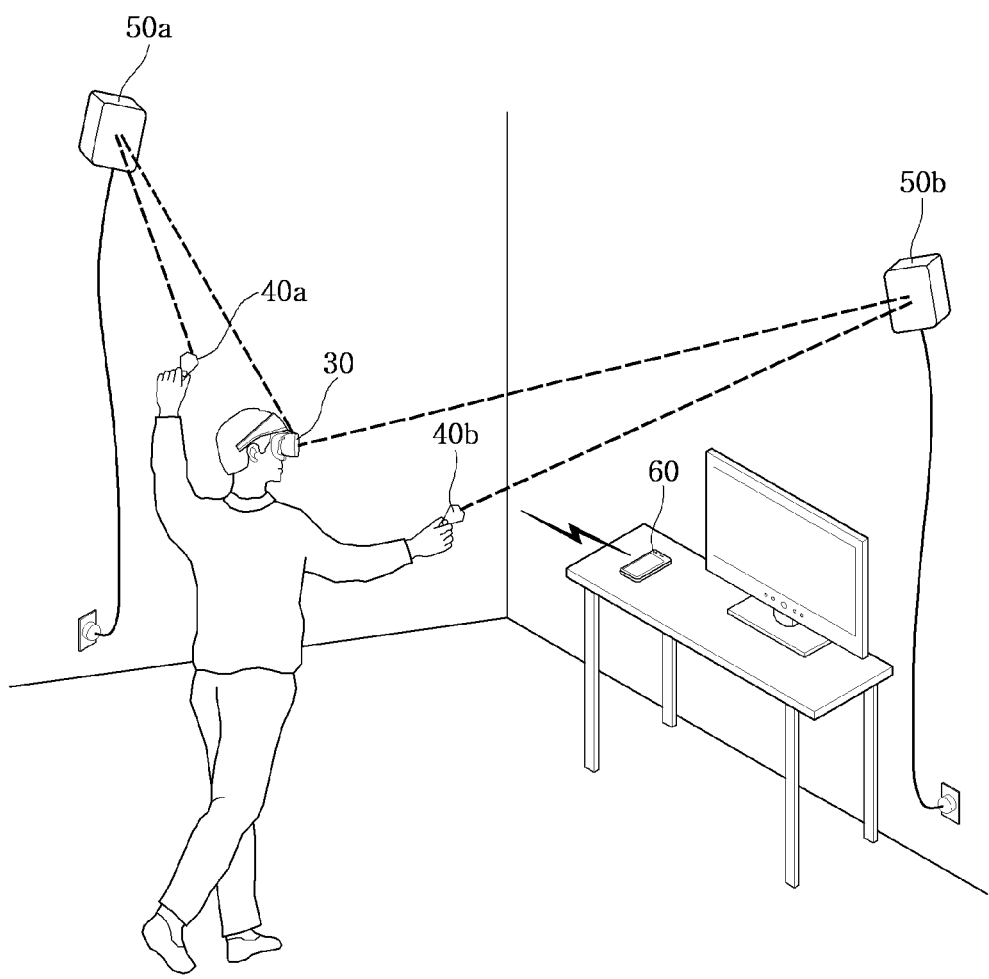
FIG. 4 illustrates a situation in which the VR electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display 32 being combined with the head unit 31 and displaying a virtual image or video in front of the user's eyes. Although the figure shows that the head unit 31 and display 32 are made as separate units and combined together, the display 32 may also be formed being integrated into the head unit 31.

The head unit 31 may assume a structure of enclosing the head of the user so as to disperse the weight of the display 32. And to accommodate different head sizes of users, the head unit 31 may provide a band of variable length.

The display 32 includes a cover unit 32a combined with the head unit 31 and a display 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display 32b is installed on the front surface frame of the cover unit 32a and disposed at the position corresponding to the eyes of the user to display screen information (image or video). The screen information output on the display 32b includes not only VR content but also external images collected through an image capture means such as a camera.

And VR content displayed on the display 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display 32b.

The display 32b may include a display panel installed at the front of the opening of the cover unit 32a, where the display panel may be an LCD or OLED panel. Similarly, the display 32b may be a display of a smartphone. In other words, the display 32b may have a specific structure in which a smartphone may be attached to or detached from the front of the cover unit 32a.

And an image capture means and various types of sensors may be installed at the front of the display 32.

The image capture means (for example, camera) is formed to capture (receive or input) the image of the front and may obtain a real world as seen by the user as an image. One image capture means may be installed at the center of the display 32b, or two or more of them may be installed at symmetric positions. When a plurality of image capture means are installed, a stereoscopic image may be obtained. An image combining an external image obtained from an image capture means with a virtual image may be displayed through the display 32b.

Various types of sensors may include a gyroscope sensor, motion sensor, or IR sensor. Various types of sensors will be described in more detail later.

At the rear of the display 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50*a*, 50*b*) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
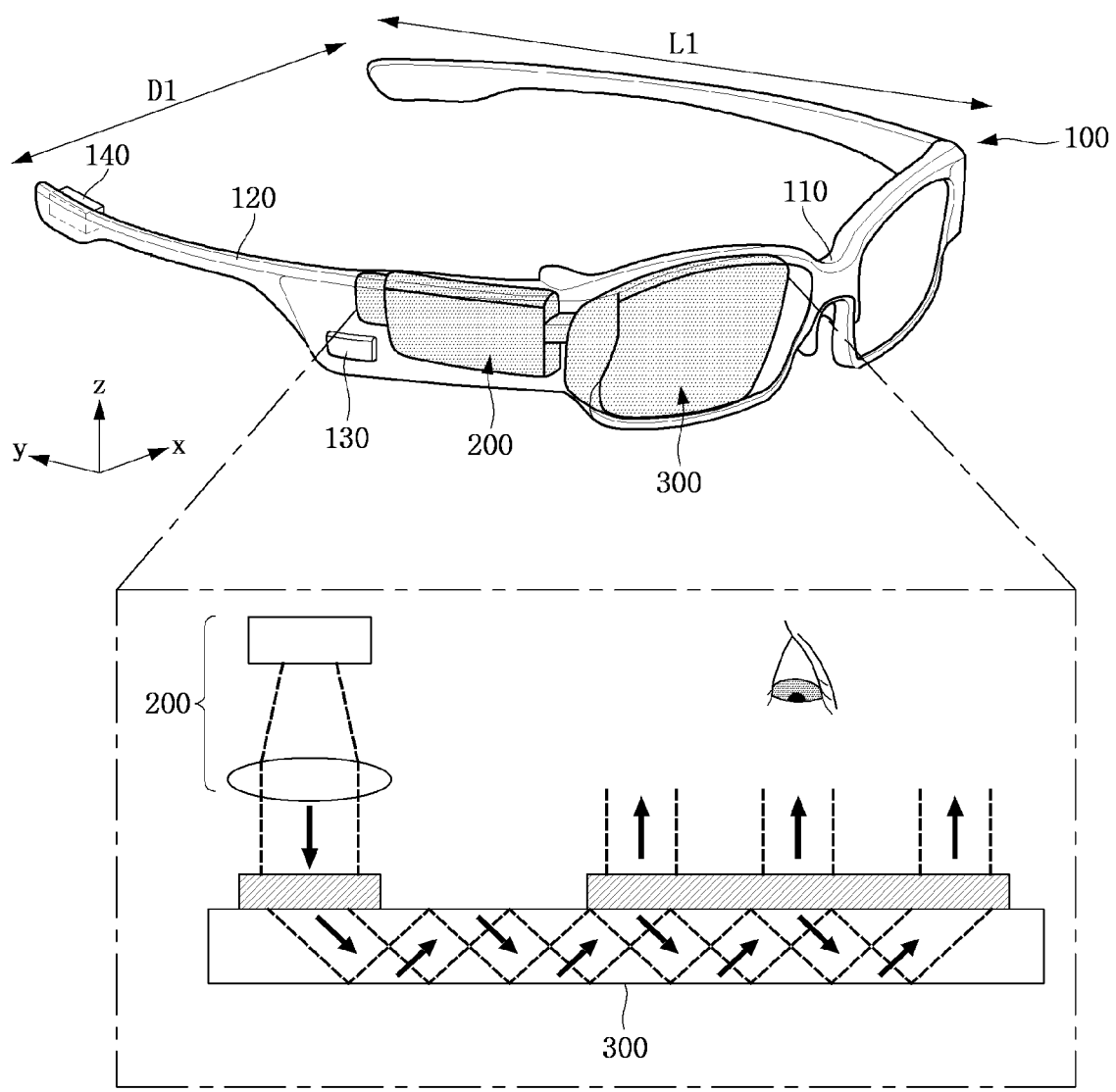
FIG. 5 is a perspective view of an AR electronic device according to one embodiment of the present disclosure.

FIG. 5 is a perspective view of an AR electronic device according to one embodiment of the present disclosure.

As shown in FIG. 5, the electronic device according to one embodiment of the present disclosure may include a frame 100, controller 200, and display 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display 300 may be implemented in the form of a Head Mounted Display (HMD). HMD refers to a particular type of display device worn on the head and showing an image directly in front of eyes of the user. The display 300 may be disposed to correspond to at least one of left and right eyes so that images may be shown directly in front of the eye(s) of the user when the user wears the electronic device. The present figure illustrates a case where the display 300 is disposed at the position corresponding to the right eye of the user so that images may be shown before the right eye of the user.

The display 300 may be used so that an image generated by the controller 200 is shown to the user while the user visually recognizes the external environment. For example, the display 300 may project an image on the display area by using a prism.

And the display 300 may be formed to be transparent so that a projected image and a normal view (the visible part of the world as seen through the eyes of the user) in the front are shown at the same time. For example, the display 300 may be translucent and made of optical elements including glass.

And the display 300 may be fixed by being inserted into the opening included in the front frame 110 or may be fixed on the front surface 110 by being positioned on the rear surface of the opening (namely between the opening and the user's eye). Although the figure illustrates one example where the display 300 is fixed on the front surface 110 by being positioned on the rear surface of the rear surface, the display 300 may be disposed and fixed at various positions of the frame 100.

As shown in FIG. 5, the electronic device may operate so that if the controller 200 projects light about an image onto one side of the display 300, the light is emitted to the other side of the display, and the image generated by the controller 200 is shown to the user.

Accordingly, the user may see the image generated by the controller 200 while seeing the external environment simultaneously through the opening of the frame 100. In other words, the image output through the display 300 may be seen by being overlapped with a normal view. By using the display characteristic described above, the electronic device may provide an AR experience which shows a virtual image overlapped with a real image or background as a single, interwoven image.

Figure 6:
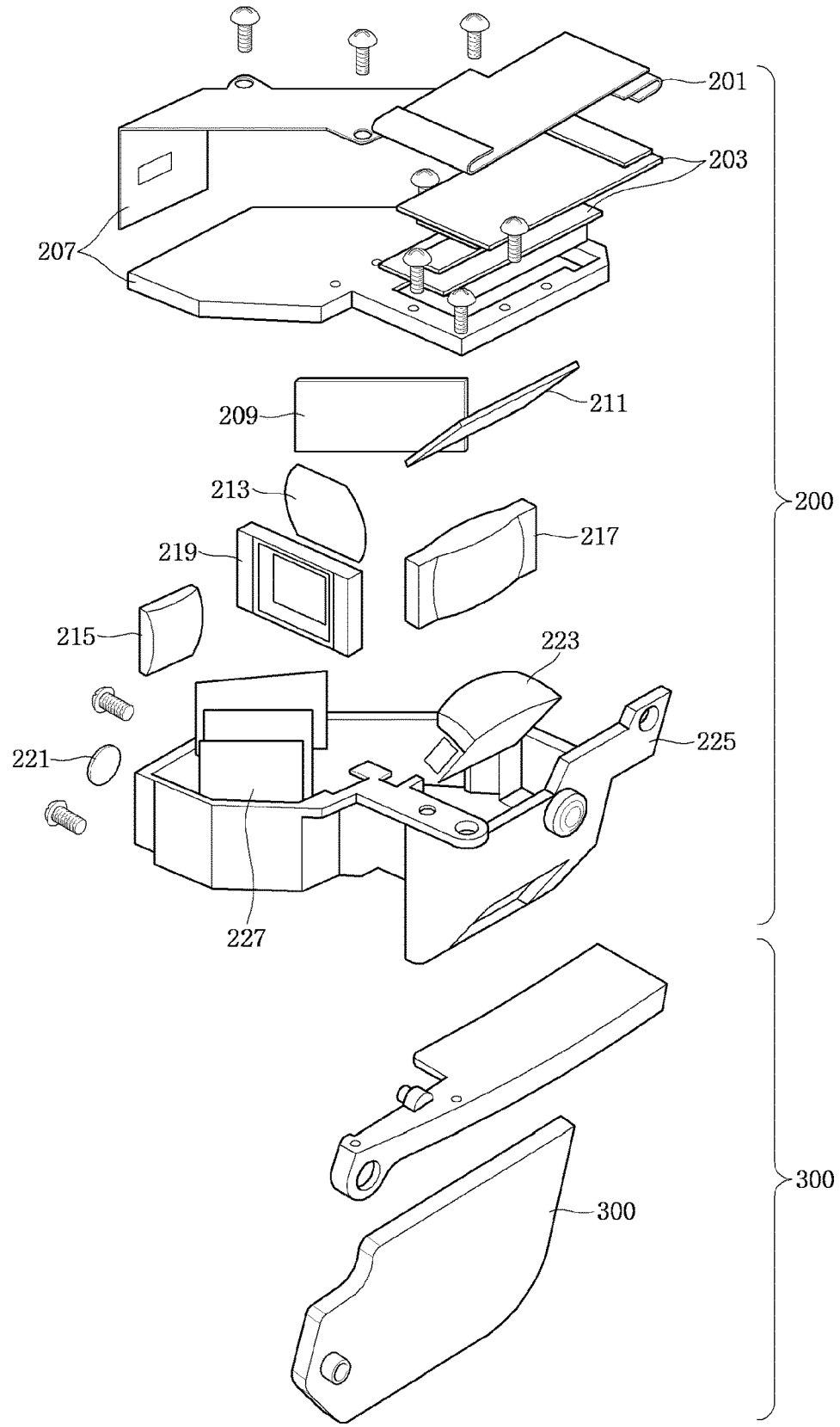
FIG. 6 is an exploded perspective view of an optical driving assembly according to one embodiment of the present disclosure.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display 300.

The display 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display 300 and various methods for emitting incident image light rays will be described.

FIGS. 7 to 13 illustrate various display methods applicable to the display 300 according to one embodiment of the present disclosure.

Figure 7:
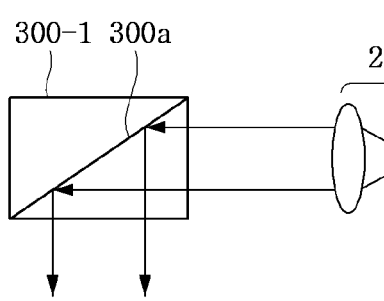
FIGS. 7 to 13 illustrate various display methods applicable to a display according to one embodiment of the present disclosure.
Figure 7:
Figure 7:
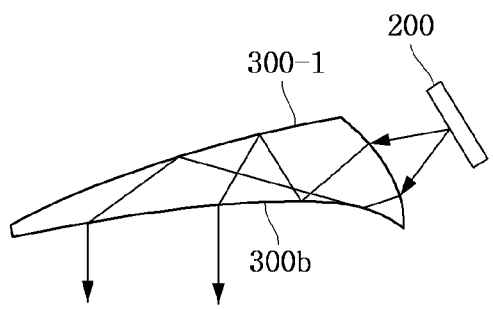
Figure 7:
Figure 8:
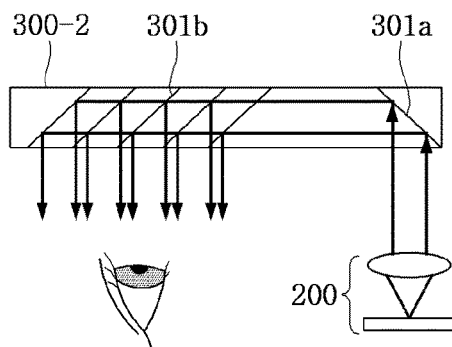
Figure 8:
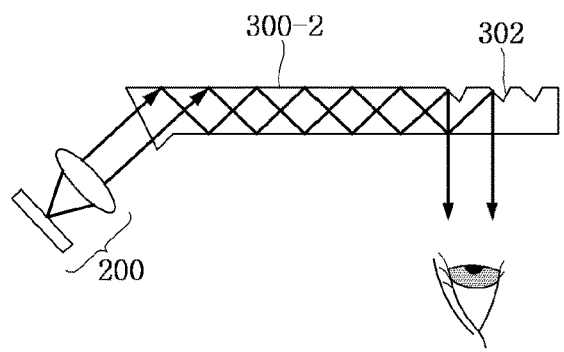
Figure 8:
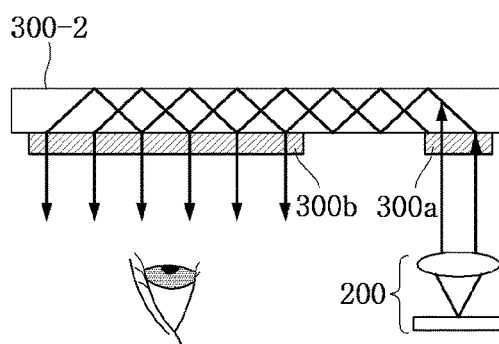
Figure 8:
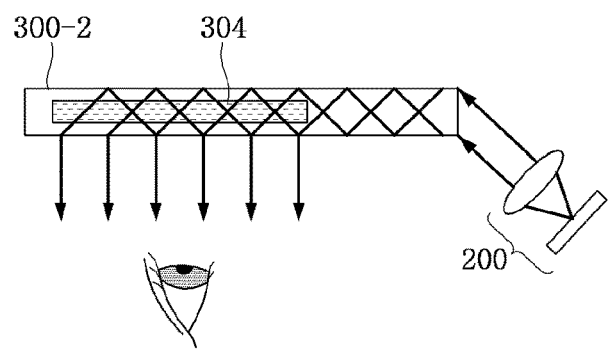
Figure 8:
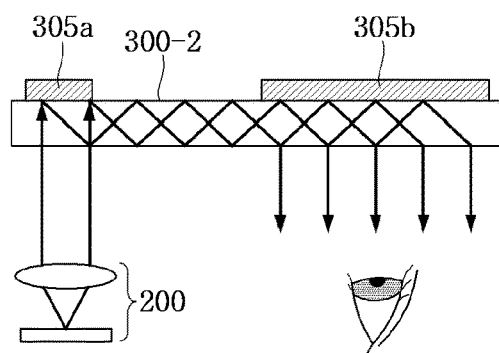
Figure 8:
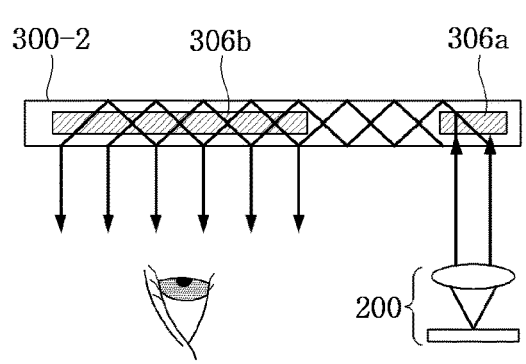
Figure 9:
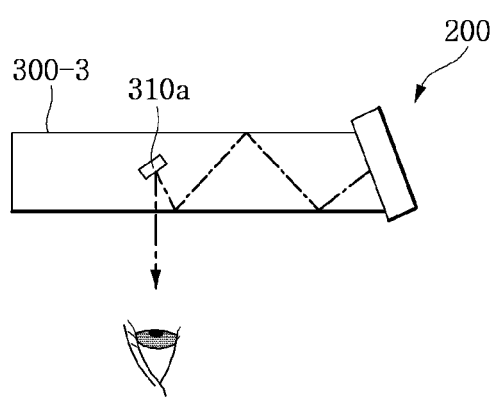
Figure 9:
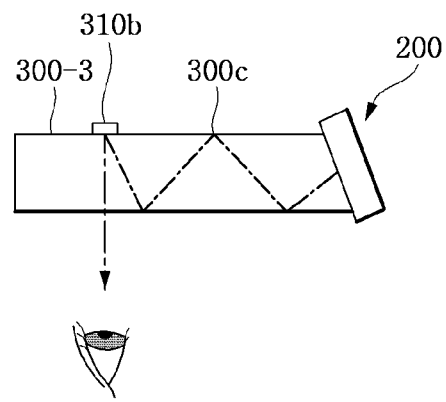
Figure 9:
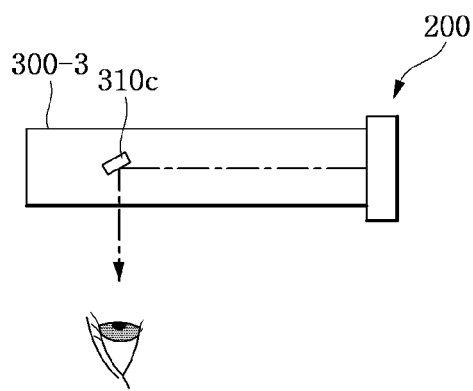
Figure 9:
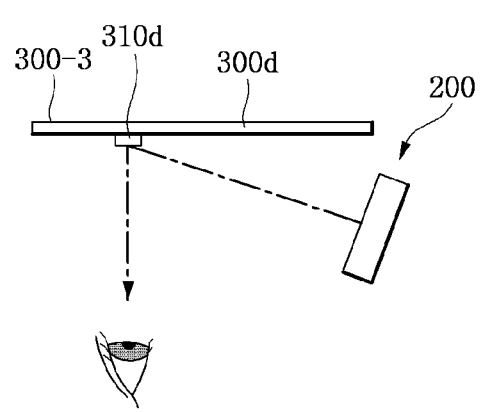
Figure 10:
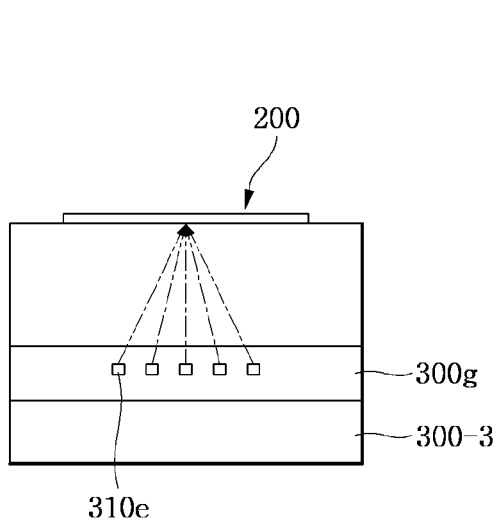
Figure 10:
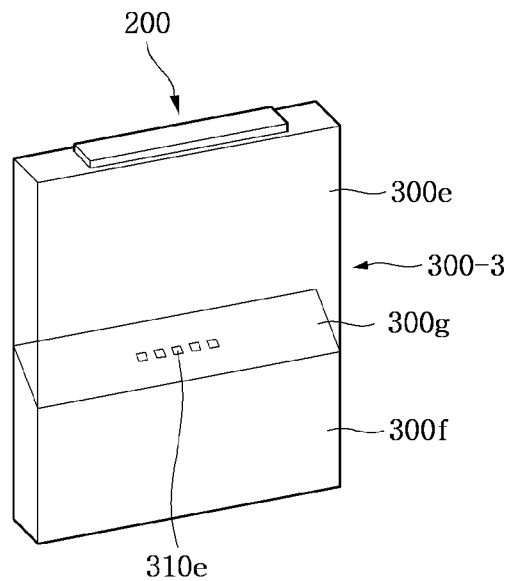
Figure 10:
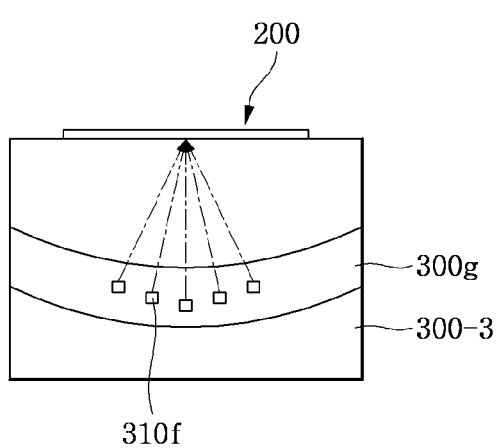
Figure 10:
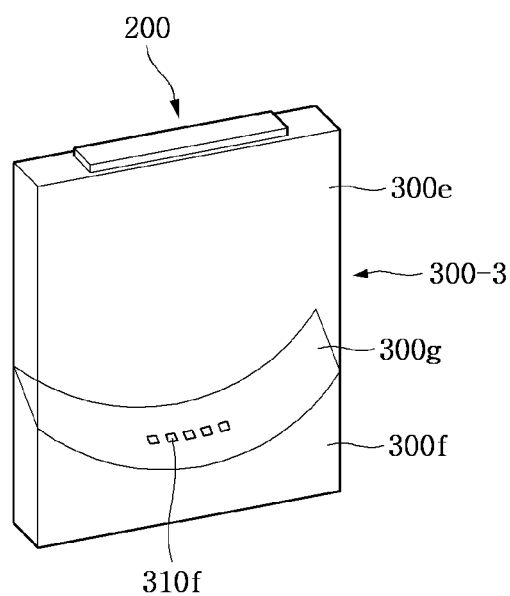
Figure 11:
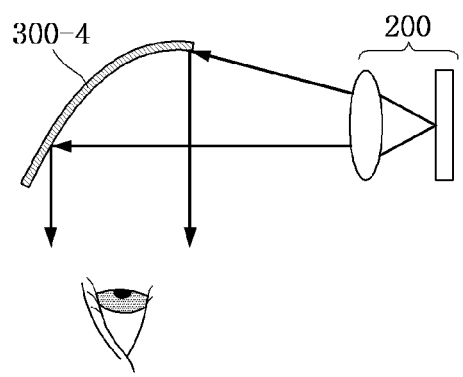
Figure 11:
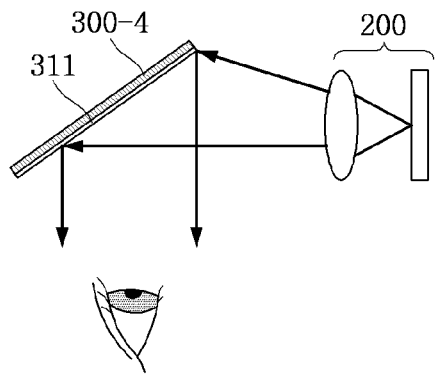
Figure 11:
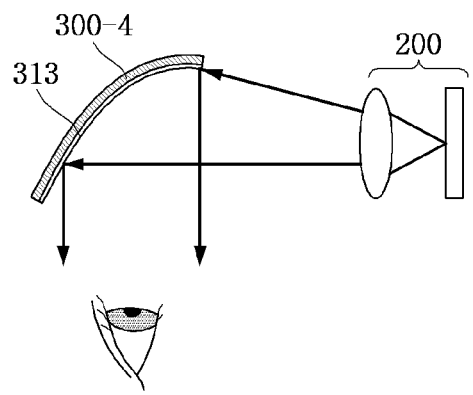
Figure 12:
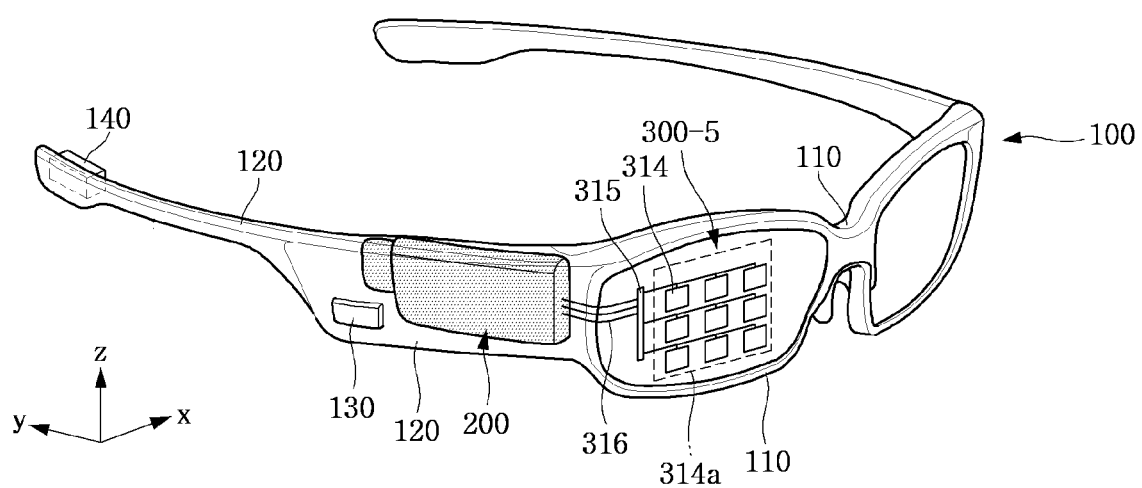
Figure 13:
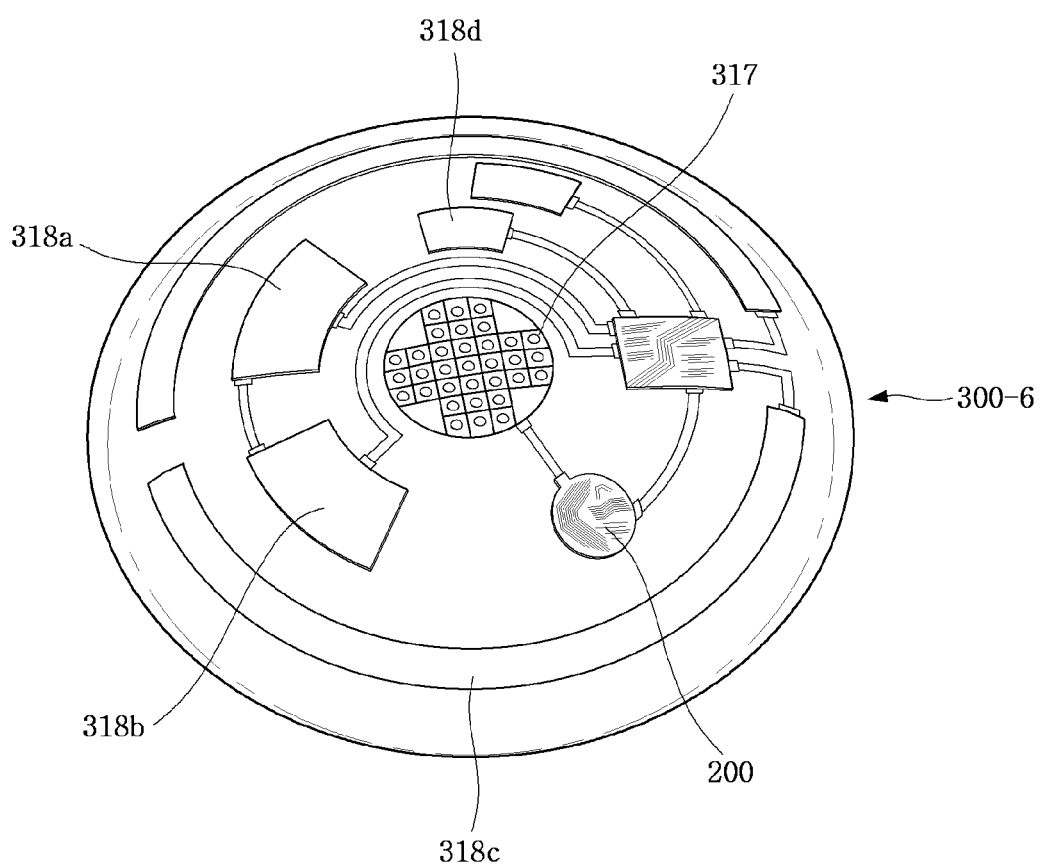

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display used for contact lenses.

As shown in FIG. 7, the display 300-1 according to one embodiment of the present disclosure may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction member 303a on the surface of the part on which the optical image is incident and a second diffraction member 303b on the surface of the part from which the optical image is emitted. The first and second diffraction members 303a, 303b may be provided in a way that a specific pattern is patterned on the surface of the glass or a separate diffraction film is attached thereon.

Accordingly, the optical image generated by the controller 200 is diffracted as it is incident through the first diffraction member 303a, guided along the longitudinal direction of the glass while being totally reflected, emitted through the second diffraction member 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display 300-3 according to another embodiment of the present disclosure may use a pin minor-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole extends the depth of field (DOF), referring to an extending of the range of an image that will appear in focus, which makes the image formed on the retina more vivid.

In what follows, an embodiment for using a pin minor-type optical element will be described with reference to FIGS. 9 and 10.

Referring to FIG. 9(a), the pinhole mirror 310a may be provided on the path of incident light within the display 300-3 and reflect the incident light toward the user's eye. More specifically, the pinhole mirror 310a may be disposed between the front surface (outer surface) and the rear surface (inner surface) of the display 300-3, and a method for manufacturing the pinhole mirror will be described again later.

The pinhole mirror 310a may be formed to be smaller than the pupil of the eye and to provide an extended depth of field. Therefore, even if the focal length for viewing a real world through the display 300-3 is changed, the user may still clearly see the real world by overlapping an augmented reality image provided by the controller 200 with the image of the real world.

And the display 300-3 may provide a path which guides the incident light to the pinhole mirror 310a through internal total reflection.

Referring to FIG. 9(b), the pinhole mirror 310b may be provided on the surface 300c through which light is totally reflected in the display 300-3. Here, the pinhole mirror 310b may have the characteristic of a prism that changes the path of external light according to the user's eyes. For example, the pinhole mirror 310b may be fabricated as film-type and attached to the display 300-3, in which case the process for manufacturing the pinhole mirror is made easy.

The display 300-3 may guide the incident light incoming from the controller 200 through internal total reflection, the light incident by total reflection may be reflected by the pinhole mirror 310b installed on the surface on which external light is incident, and the reflected light may pass through the display 300-3 to reach the user's eyes.

Referring to FIG. 9(c), the incident light illuminated by the controller 200 may be reflected by the pinhole mirror 310c directly without internal total reflection within the display 300-3 and reach the user's eyes. This structure is convenient for the manufacturing process in that augmented reality may be provided irrespective of the shape of the surface through which external light passes within the display 300-3.

Referring to FIG. 9(d), the light illuminated by the controller 200 may reach the user's eyes by being reflected within the display 300-3 by the pinhole mirror 310d installed on the surface 300d from which external light is emitted. The controller 200 is configured to illuminate light at the position separated from the surface of the display 300-3 in the direction of the rear surface and illuminate light toward the surface 300d from which external light is emitted within the display 300-3. The present embodiment may be applied easily when thickness of the display 300-3 is not sufficient to accommodate the light illuminated by the controller 200. Also, the present embodiment may be advantageous for manufacturing in that it may be applied irrespective of the surface shape of the display 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display 300-3 to compensate for the path difference of the light reflected from the plurality of pinhole mirrors 310e disposed side by side in a row.

The surface reflection-type optical element that may be applied to the display 300-4 according to another embodiment of the present disclosure may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display 300-5 employing micro LED as shown in FIG. 12 and a display 300-6 employing a contact lens as shown in FIG. 13 may also be used.

Referring to FIG. 12, the optical element of the display 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display 300-5 along a conductive input line 316, and the display 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display 300-5. And the plurality of optical elements 314 may be disposed on a transparent substrate.

The image signal generated by the controller 200 is sent to an image split circuit 315 provided at one side of the display 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display 300 according to one embodiment of the present disclosure may include a retina scan method.

FIGS. 14 to 25 are conceptual cross-sectional views of the optical driving assembly 200 and the display 300 of the electronic device 20 related to the present disclosure.

The optical driving assembly 200 may form image light corresponding to a content to be output, and emit the image light to an optical element 301. More specifically, a configuration which directly emits the image light in the optical driving assembly 200 may be an image source panel. A description of the image source panel is the same as described above. The optical element 301 may be a panel in the form of an optically transparent plate, and, for example, the optical element 301 may include a photopolymer material.

The optical element 301 receives the image light emitted from the optical driving assembly 200 and output the received image light. The optical element 301 of the present disclosure provides a clear image through a pin mirror. The pin mirror is implemented in the form of a small mirror to reflect image light to have an extended depth of field (DOF). An optical system forming an extended DOF widens available positions for a user's eyes. For a detailed description thereof, FIGS. 9, 10, and 11 are referred to.

A pin mirror member 420 may be a single pin mirror or a plurality of pin mirrors. In a case where the pin mirror member 420 is provided as a plurality of pin mirrors, the pin mirror member 420 is provided in a regular pattern. For example, the pin mirror may be in a square array pattern within a lattice.

The optical driving assembly 200 allow image light to be incident on one side of the optical element 301. One side of the optical element 301 may be defined as one side in a lengthwise direction within a space between an inner side surface 3011 of the plate-shaped optical element 301 being directed toward a user's eyes and an outer side surface 3012 of the plate-shaped optical element 301 being directed toward an outside. Alternatively, one side of the optical element 301 may indicate an upper side in a state in which the plate-shaped optical element 301 is erected. Accordingly, the other side may indicate the opposite side of one side in the lengthwise direction of the optical element 301, that is, a lower side.

Image light is incident on one side of the optical element 301, travels in the lengthwise direction of the optical element 301, and then arrives at the user's eyes through the pin mirror member 420. As the optical driving assembly 200 is provided on one side of the optical element 301, the optical driving assembly 200 is able to provide the image light without obstructing a field of view of the user, and the display 300 may allow image light emitted from one side of the optical driving assembly 200 to be output at a central area of the optical element 301.

The pin mirror member 420 is provided inside the optical element 301. Light incident on the optical element 301 may be reflected by the pin mirror member 420 and then emitted to the outside of the optical element 301, that is, the user's eyes, again.

However, as described above, a double image problem does not occur only when a sufficient distance is ensured from the optical driving assembly 200 and the pin mirror member 420. Conventionally, there is a problem that it is difficult to ensure a distance from an emission point of the optical driving assembly 200 to the pin mirror member 420. Accordingly, the present disclosure explores a method for securing a distance on an optical path from the optical driving assembly 200 to the pin mirror member 420.

As the first method for increasing a distance on the optical path, there is a method for totally reflecting image light in the optical element 301. Image light may travel by being totally reflected between the inner side surface 3011 and the outer side surface 3012 on a path formed by the inner side surface 3011 and the outer side surface 3012 of the plate-shaped optical element 301, and thereby the image light may arrive at the pin mirror member 420. Arriving at the pin mirror member 420 by being totally reflected is geometrically advantageous in ensuring a path length in comparison to an opposite case. In order to realize total reflection, the optical driving assembly 200 allow image light in a direction inclined obliquely by a predetermined angle with respect to the lengthwise direction of the optical element 301.

The second method is that image light arrives at the other side of the optical element 301, returns back again, and is then reflected by the pin mirror member 420. To this end, a reflection member 410 is provided at the other side of the optical element 301.

When image light incident on the optical element 301 travels inside the optical element 301 and then arrives at the other side of the optical element 301, the reflection member 410 may reflect the image light, arrived at the other side of the optical element 301, again in a direction from which the image light travelled. The direction from which the image light travelled refers to a direction from one side to the other side of the optical element 301, and it does not limit angle by which the image light arrives.

The second method may be implemented independently of the first method regarding total reflection. Thus, embodiments in which image light arrives at the pin mirror member 420 after being reflected by the reflection member 410 may be realized including both a case where total reflection does not occur and a case where total reflection occurs.

More specifically, the reflection member 410 may be provided on the outer side connection surface 3014. The other side connection surface 3014 indicates a surface that connects the outer side surface 3012 and the inner side surface 3011 from the other side of the plate-shaped optical element 301. As the reflection member 410 is provided on the other side connection surface 3014, the reflection member 410 may form a reflective surface in the same shape of a partial area of the other side connection surface 3014. The reflection member 410 may be laminated or printed on the other side connection surface 3014, and, in this case, the reflection member 410 and the other side connection surface 3014 may be brought into contact tightly with each other. As the reflection member 410 includes a metal material, the reflection member 410 may reflect image light.

As the pin mirror member 420 is disposed between a point at which image light is incident from the optical element 301 and a point at which the image light is reflected, the pin mirror member 420 reflects image light reflected by the reflation unit 410 toward the inner side surface 3011 so that the image light arrives at the user's eyes. To this end, the reflective surface of the pin mirror member 420 is directed toward the reflection member 410 and the inner side surface 3011. That is, a normal vector N of a reflective surface 4201 of the pin mirror member 420 may is positioned between the other side vector V in the lengthwise direction of the optical element 301 in an erected state and a normal vector H of the inner side surface 3011.

Following are embodiments according to a shape, an incidence/reflection method, an incidence/reflection position, and the like of the reflection member 410.

Figure 14:
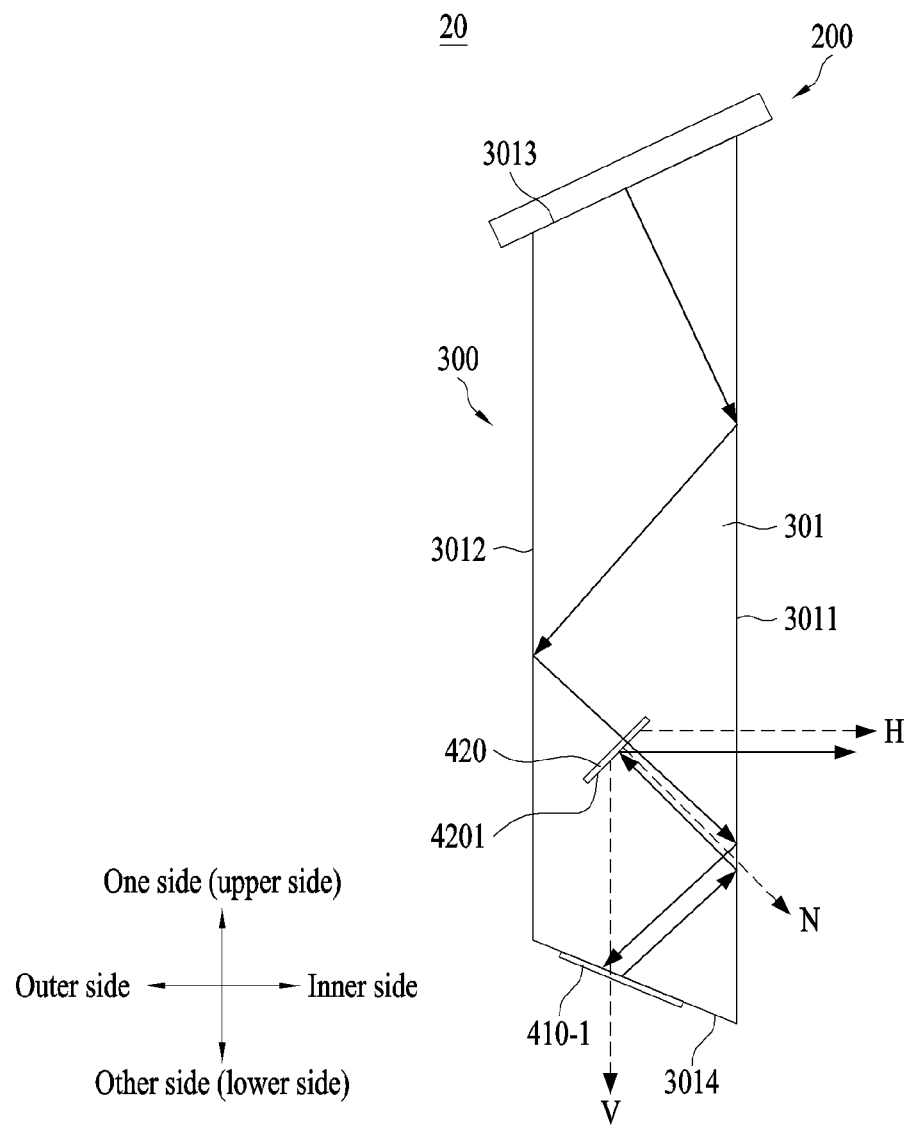
FIGS. 14, 15, and 16 are conceptual cross-sectional views of an optical driving assembly and a display of an electronic device related to the present disclosure.
Figure 15:
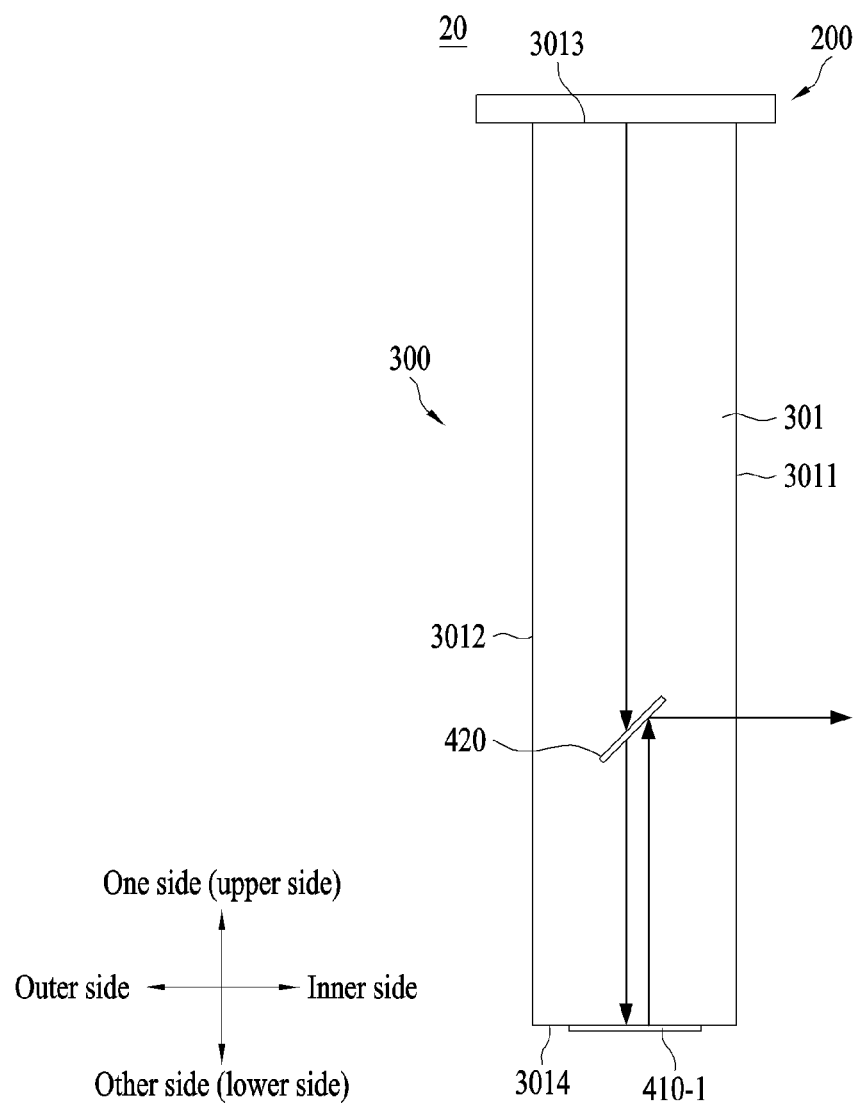
Figure 16:
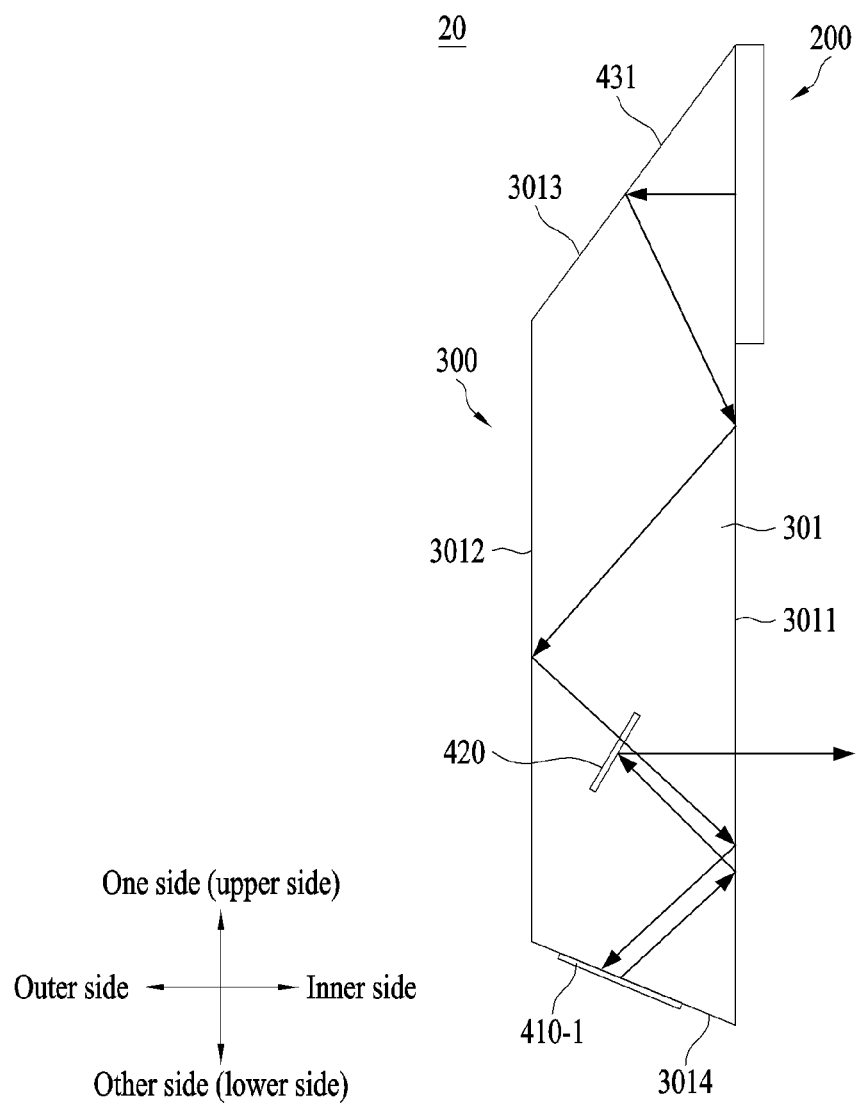

Referring to FIGS. 14, 15, and 16, the reflection member 410 may include a flat area. In order to realize a reflection member 410-1 of a flat area, the other side connection surface 3014 may be realized in the form of a flat surface as well. Configurations each in the form of a flat surface make processes easy. In addition, refraction is not performed and thus a simple optical design is possible.

In the case of FIGS. 14 and 16 where image light is totally reflected, the reflection member 410-1 may form an inclined surface with respect to the inner side surface 3011 or the outer side surface 3012 to correspond to an angle by which the image light is totally reflected. On the other wise, in the case of FIG. 15 where image light is not totally reflected, the reflection member 410-1 may be provided vertical to the inner side surface 3011 or the outer side surface 3012.

Meanwhile, referring to FIGS. 17 to 22, the reflection member 410 may include a curved area. A reflection member 410-2 of the curved area allows a focal length to be short on an optical path of image light. Accordingly, according to a curvature designed value, a vertical width of the optical element 301 may be reduced and an image may be formed at a location appropriate for a user. As a concave surface of the curved area is provided to be directed toward the inside of the optical element 301, the reflection member 410-2 may play a role of a convex lens that reduces a focal length.

Figure 17:
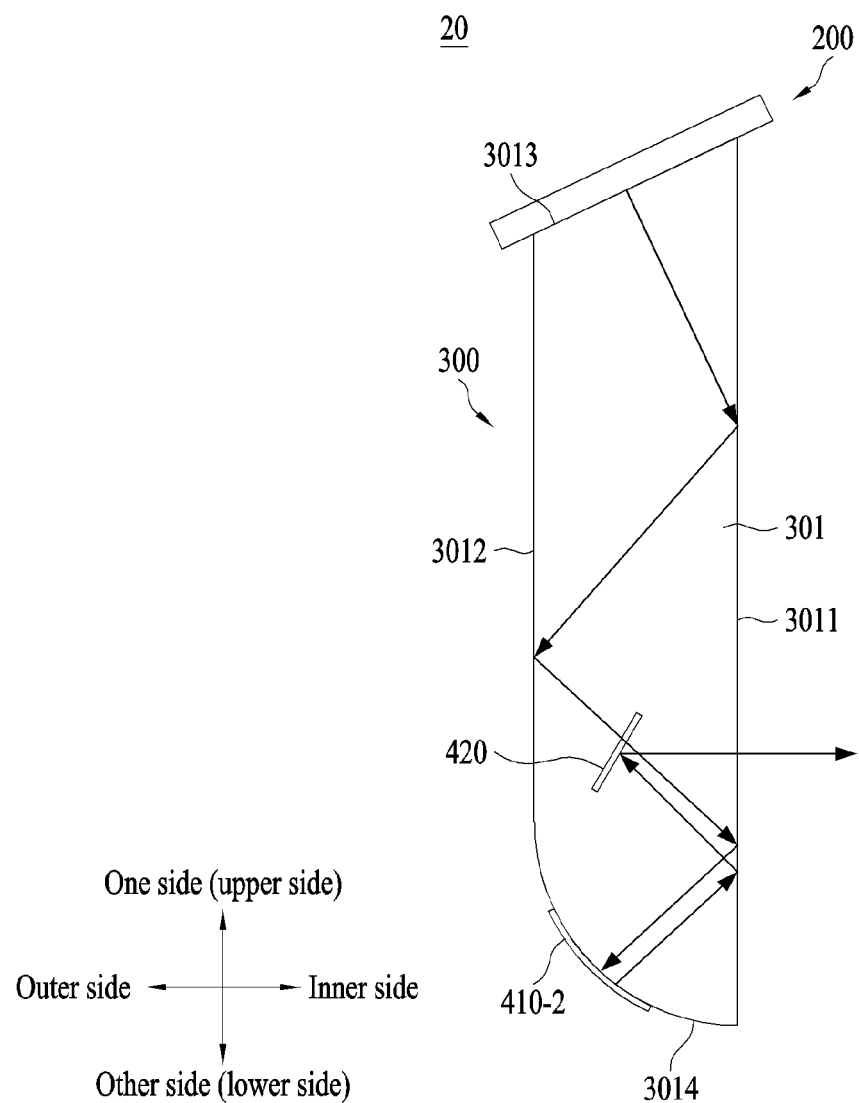
FIGS. 17 to 22 are conceptual cross-sectional views of an optical driving assembly and a display of an electronic device related to the present disclosure.
Figure 18:
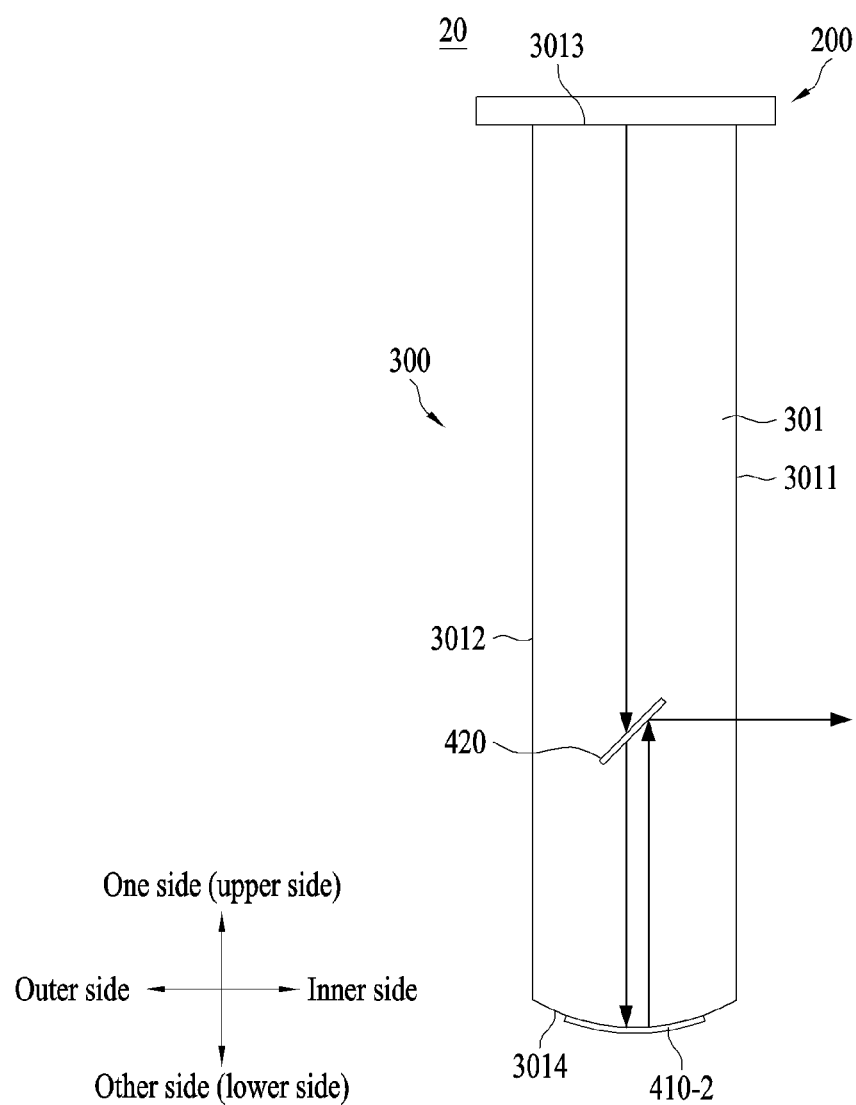
Figure 19:
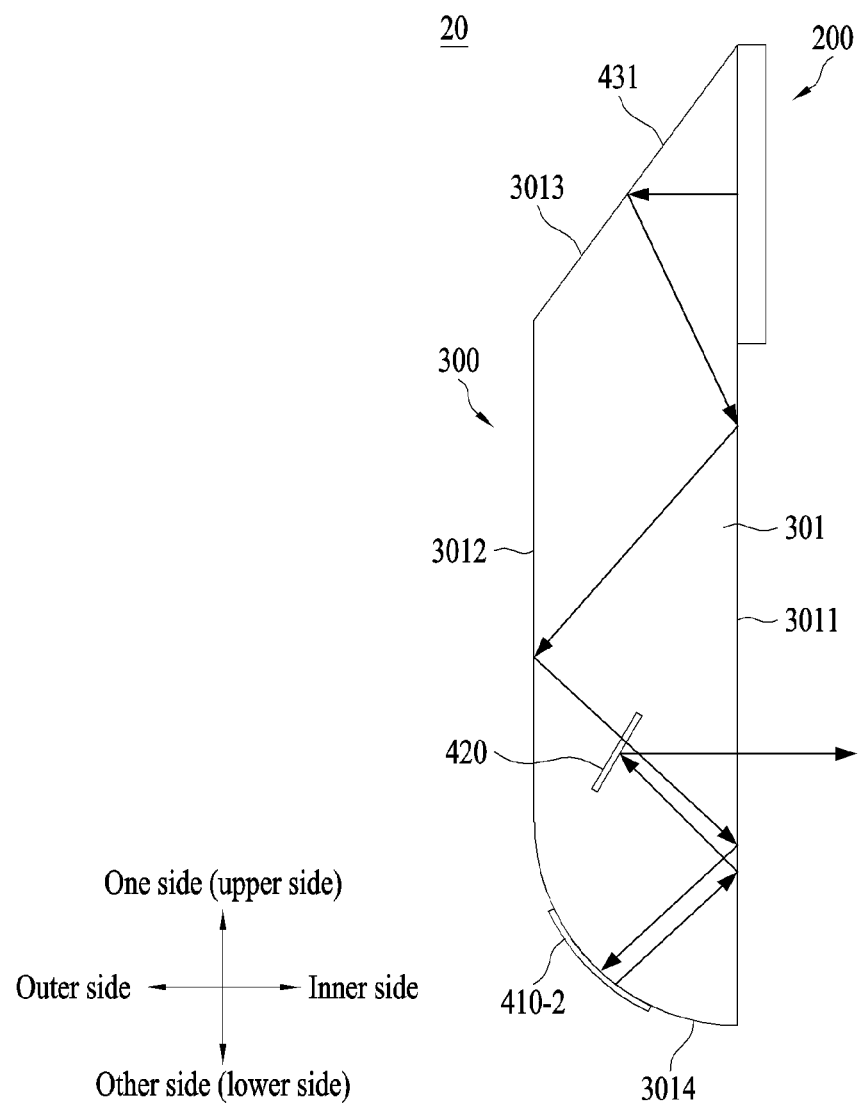
Figure 20:
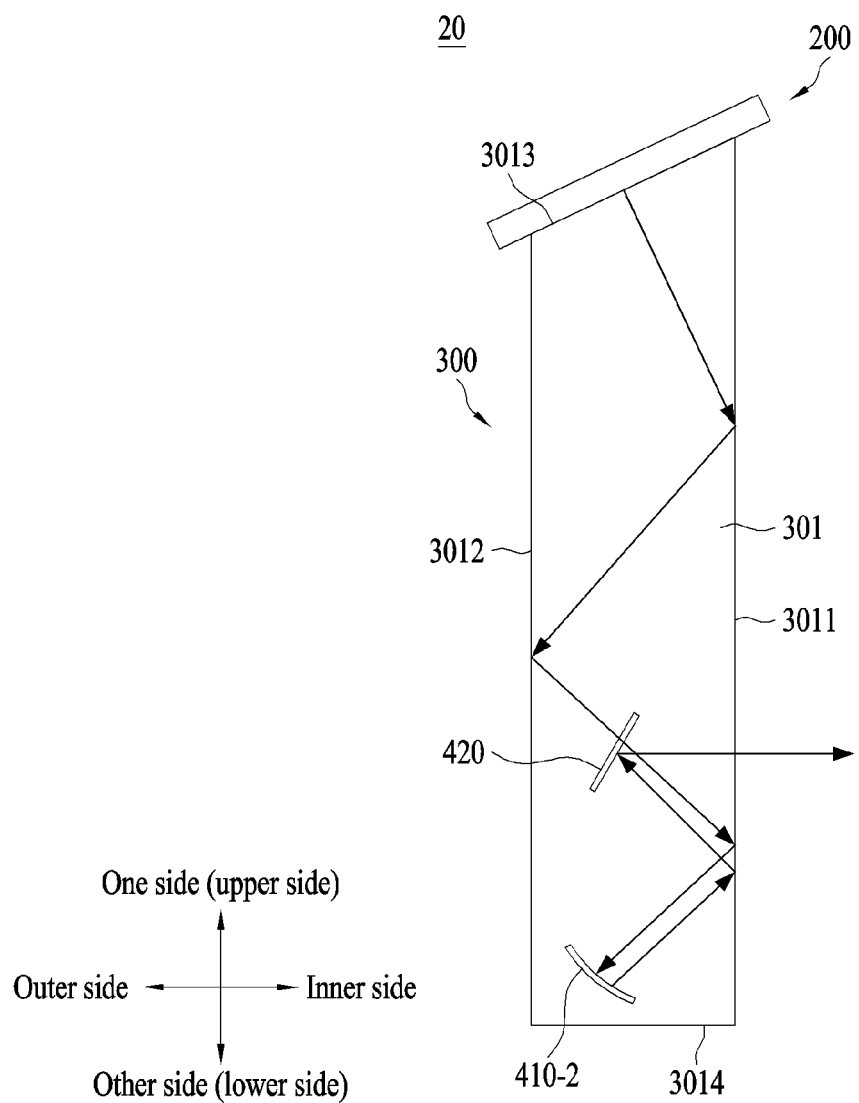

In order to realize the reflection member 410-2 including the curved area, an outer surface shape of the outer side connection surface 3014 of the optical element 301 may be formed in a curved surface (see FIGS. 17, 18, and 19). That is, the curved area may be laminated or printed on the other side connection surface 3014. Alternatively, the reflection member 410-2 may be inserted into the other side of the optical element 301 (see FIGS. 20, 21, and 22). The former case may have a difficulty in inserting the reflection member 410-2 into the optical element 301, but the other side of the optical element 301 has a simple shape: therefore, it is easy to manufacture the corresponding side, the reflection member 410-2 is less likely to be damaged, and it is possible to minimize restrictions to the shape of the optical element 301 due to the reflection unknit 410-2.

Figure 21:
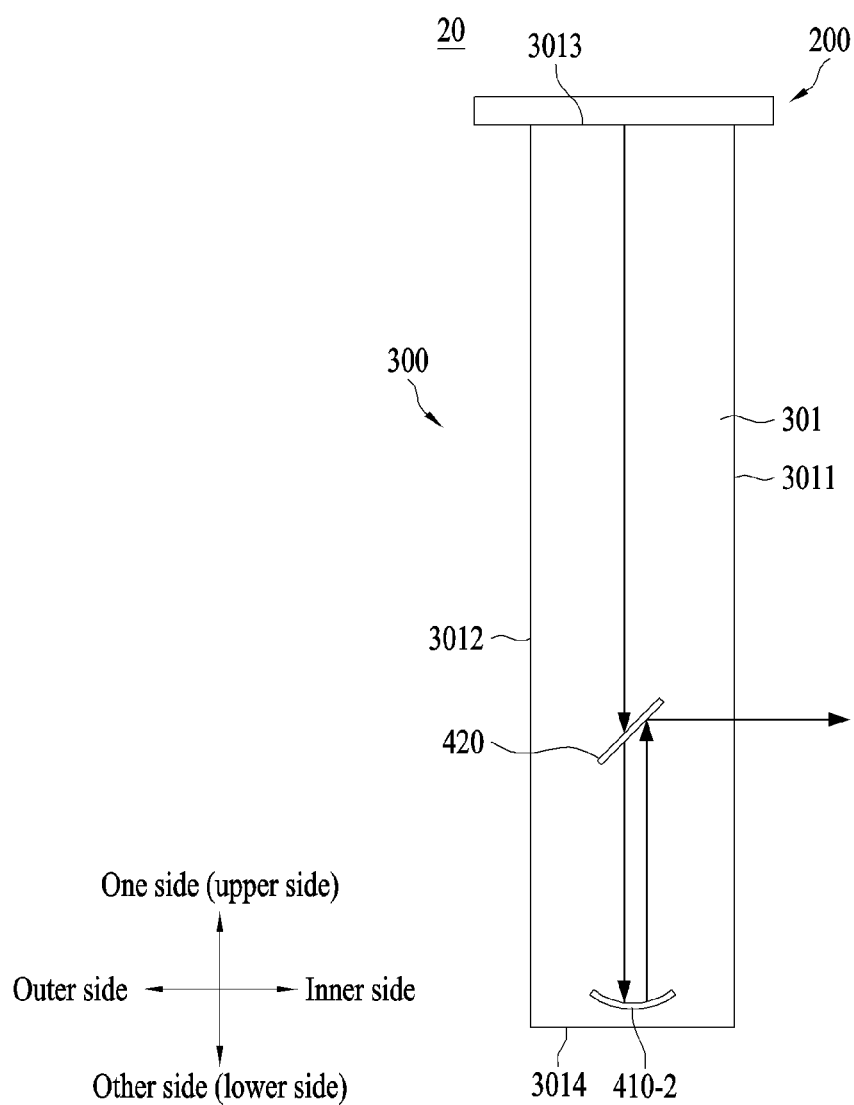
Figure 22:
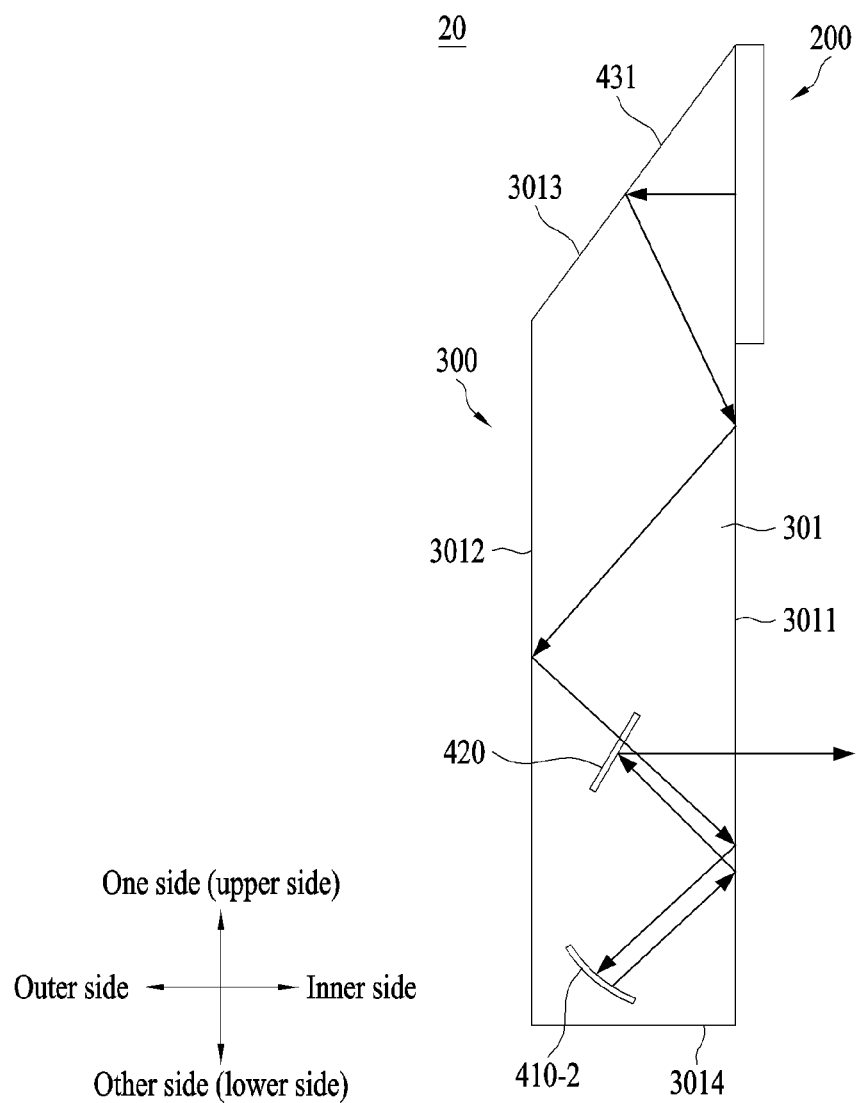

Similarly to the embodiments shown in FIGS. 14, 15, and 16, the reflection member 410-2 of the curved area may be provided in a curved surface of which a symmetric axis is inclined (see FIGS. 17, 19, 20, and 22) or may be provided in a curved surface of which a symmetric axis is in the same direction as the lengthwise direction of the optical element 301 (see FIGS. 18 and 21).

Figure 23:
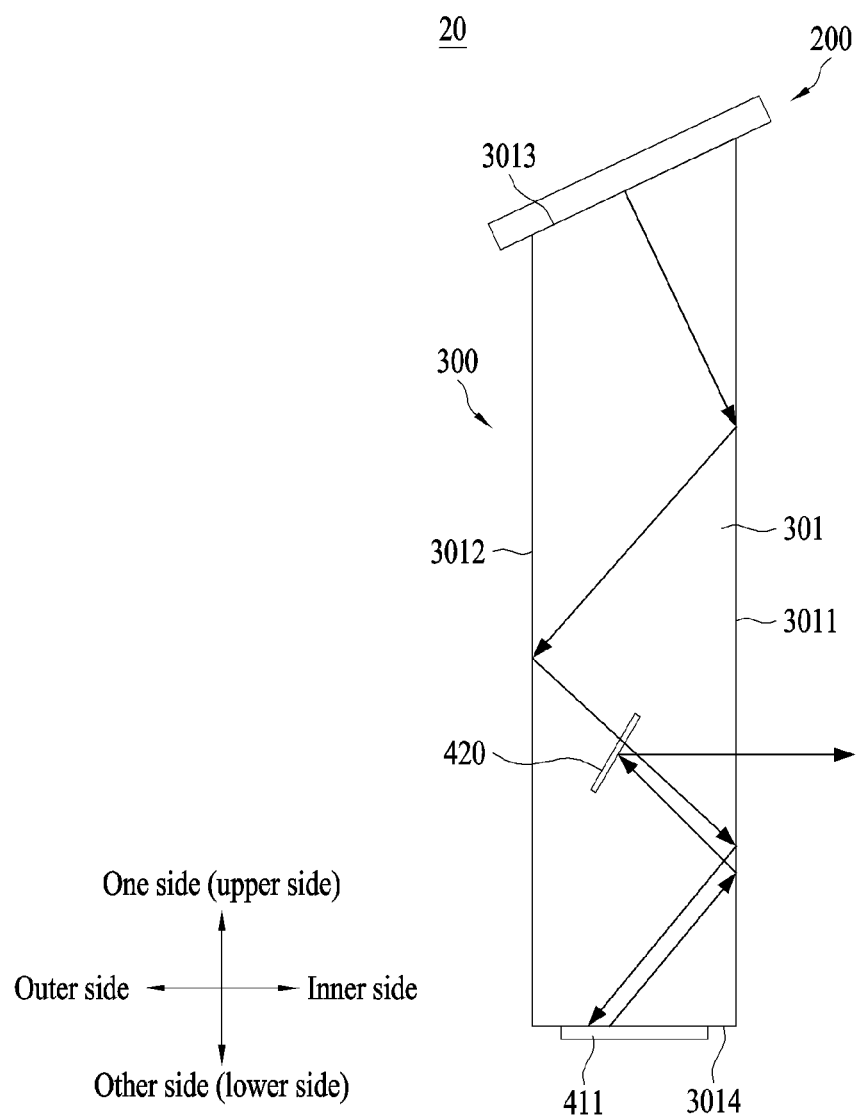
FIGS. 23, 24, and 25 are conceptual cross-sectional views of an optical driving assembly and a display of an electronic device related to the present disclosure.
Figure 24:
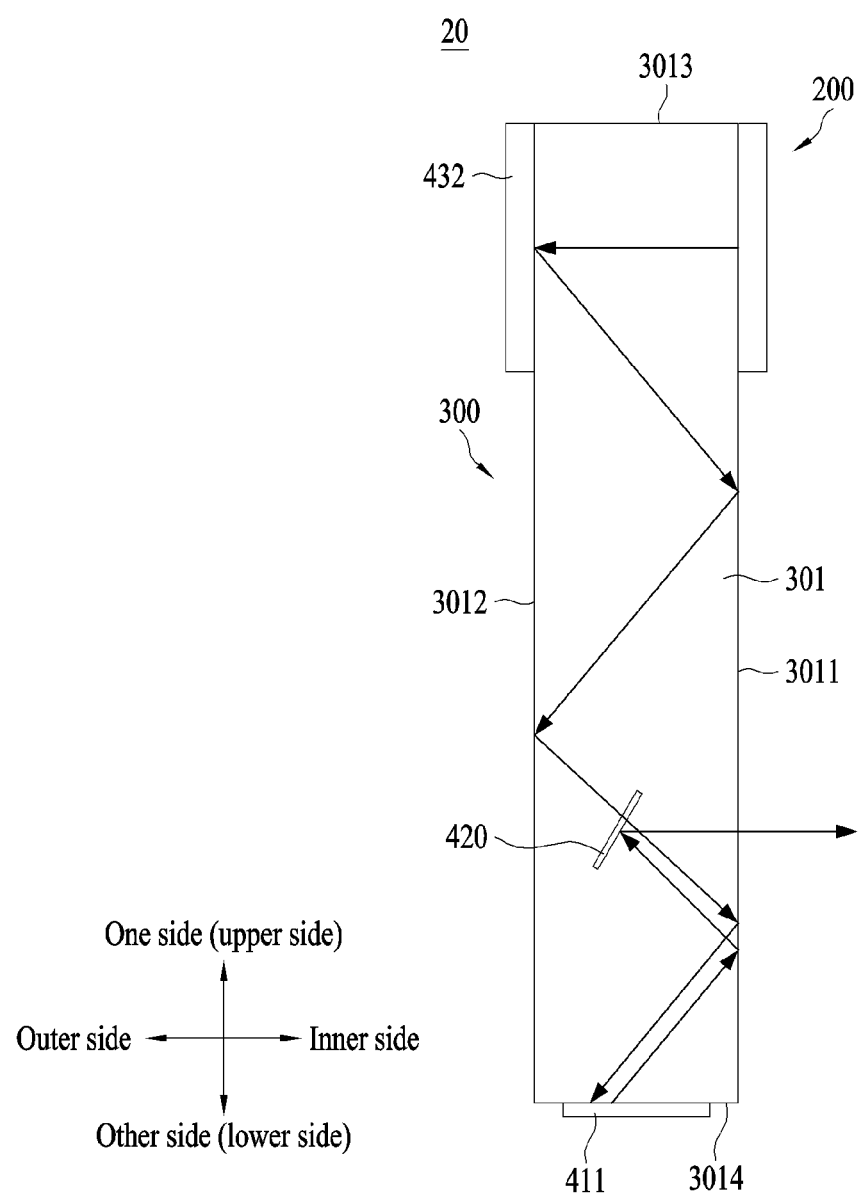
Figure 25:
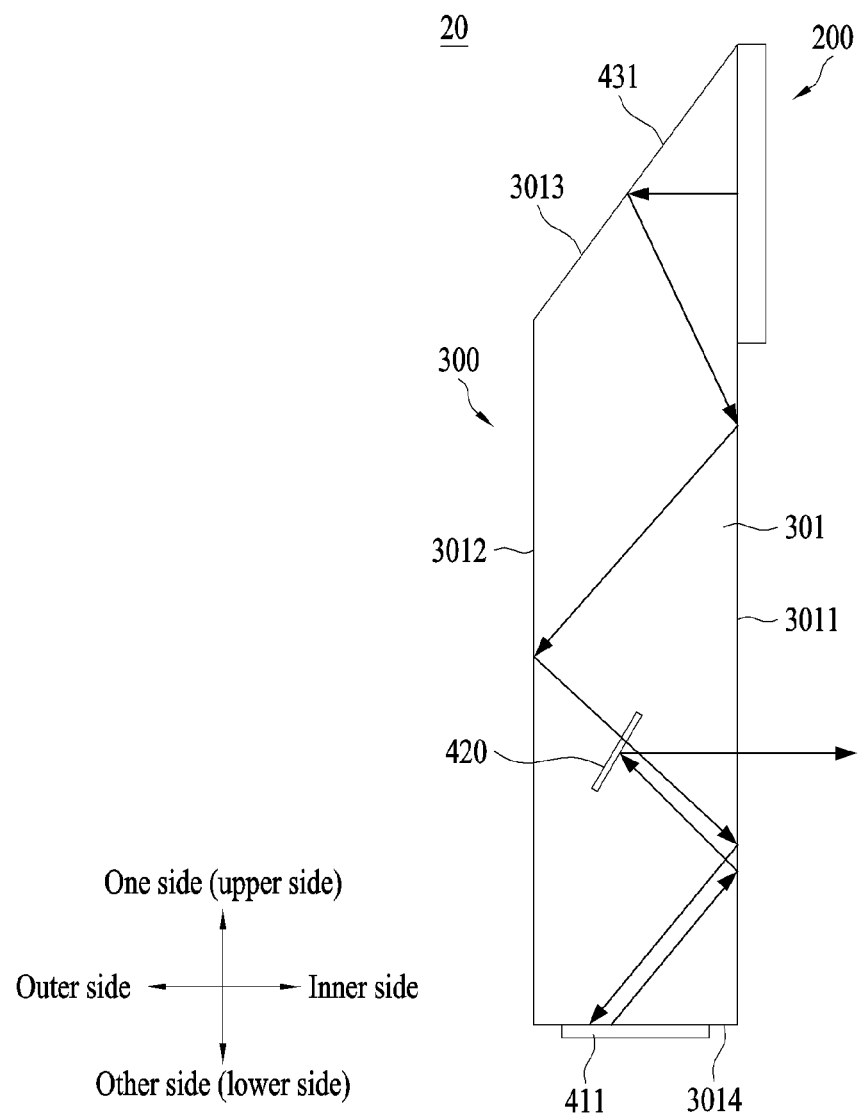

In embodiments of FIGS. 23, 24, and 25, a shape of the reflection member 410 or the other side connection surface 3014 are not limited in order to control a reflection orientation and a level of refraction of image light having arrived at the reflection member 410.

The reflection member 410 includes a retro-reflector element 411 and thus allow image light having arrived at the reflection member 410 to be reflected in a direction from which the light arrived. For example, a reflective surface of the reflection member 410 including the retro-reflector element 411 includes a flat surface and may be formed vertical to the inner side surface 3011 or the outer side surface 3012 of the optical element 301. Accordingly, the optical element 301 may have a simple shape.

Meanwhile, for stable structure of the optical driving assembly 200 and the display 300, a light exit surface of the optical driving assembly 200 and a light incidence surface of the optical element 301 may have shapes corresponding thereto. In particular, the optical driving assembly 200 may allow image light to be incident through one side connection surface 3013 of the optical element 301 (see FIGS. 14, 15, 17, 18, 20, 21, and 23) and may allow image light to be incident on one point of the inner side surface 3011 and reflected once through an auxiliary reflection member 431 provided on one side connection surface 3013 so that the image light travels in the lengthwise direction (see FIGS. 16, 19, 22, and 25). In the case of allowing the image light to be incident through the inner side surface 3011, the optical driving assembly 200 may be positioned inside the optical element 301 and therefore design freedom of the electronic device 20 may increase.

In the case where the light incidence surface of the optical element 301 is vertical to the inner side surface 3011 or the outer side surface 3012.

Alternatively, as shown in FIG. 24, even in the case of allowing image light to be incident through the inner side surface 3011, a path for totally reflecting image light in the lengthwise direction of the optical element 301 using a diffraction element 432 instead of the auxiliary unit 431 may be formed. The diffraction unit 432 is not limited to an angle, unlike a plane mirror. Accordingly, in a case where image light emitted from the optical driving assembly 200 is incident through the inner side surface 3011 of the optical element 301 and the diffraction element 432 is positioned on the outer side surface 3012 on an optical path after the incidence of the image light, the image light may be totally reflected in the lengthwise direction of the optical element 301. In the embodiment of FIG. 24, the image light can be totally reflected and one side connection surface 3013 can be formed vertical to the inner side surface 3011 or the outer side surface 3012 of the optical element 301, and therefore, the optical element 301 may be realized in a simple shape. Further, the other side connection surface 3014 may be formed vertical to the inner side surface 3011 or the outer side surface 3012 by the reflection member 410 of the retro-reflector element 411. In the embodiment of FIG. 24, the optical element 301 may be realized with a rectangular cross-sectional area and thus may be processed easily.

The above detailed description should not be construed as limiting in all respects but should be considered as illustrative. The scope of the present disclosure should be determined by reasonable interpretation of the appended claims, and all changes within the equivalent scope of the present disclosure are included in the scope of the present disclosure.

Some or other embodiments of the present disclosure described above are not exclusive or distinct from one another. Certain embodiments or other embodiments of the present disclosure described above may be combined or used together in each configuration or function.

For example, it means that A configuration described in certain embodiments and/or drawings and B configuration described in other embodiments and/or drawings may be combined. In other words, even when the combination between the configurations is not described directly, it means that the combination is possible unless clearly stated otherwise.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

The advantageous effects of the electronic device according to the present disclosure will be described below.

According to at least one of embodiments of the present disclosure, an optical path distance from the optical driving assembly to the pin mirror may be increased to thereby address the double image problem.

According to at least one of embodiments of the present disclosure, a field of depth (FOD) may be extended to thereby form a clear image.

According to at least one of embodiments of the present disclosure, design freedom of the optical driving assembly may be increased.

According to at least one of embodiments of the present disclosure, a manufacturing cost for the optical element may be reduced.

What is claimed is:

1. An electronic device comprising:
an optical element comprising an inner side surface configured to be directed toward a user's eye and an outer side surface opposite to the inner side surface;
an optical driving assembly configured to allow image light to be incident on one side of the optical element adjacently between the inner side surface and the outer side surface;
a reflection member provided at another side of the optical element opposite the one side and configured to reflect the image light to travel along an inside of the optical element; and
a pin mirror member disposed between a point at which the image light is incident on the one side of the optical element and a point at which the image light is reflected by the reflection member at the another side of the optical element and configured to reflect the image light reflected by the reflection member toward the inner side surface of the optical element for extending a depth of field (DOF).

2. The electronic device of claim 1, wherein the optical element further comprises an another side collection surface configured to connect the inner side surface and the outer side surface, and wherein the reflection member comprises a reflective surface in a shape identical to a shape of at least one partial area of the another side connection surface.

3. The electronic device of claim 2, wherein the reflection member is laminated or printed on the at least a partial area of the another side connection surface.

4. The electronic device of claim 1, wherein a reflective surface of the pin mirror member is directed toward the reflection member and the inner side surface.

5. The electronic device of claim 1, wherein the reflection member comprises a flat area.

6. The electronic device of claim 5, wherein the image light is totally reflected between the inner side surface and the outer side surface of the optical element and then arrives at the reflection member, and wherein the reflection member forms a surface inclined obliquely with respect to the inner side surface or the outer side surface of the optical element.

7. The electronic device of claim 5,
wherein the image light arrives at the reflection member without being totally reflected by the inner side surface and the outer side surface of the optical element, and
wherein the reflection member forms a surface vertical to the inner side surface and the outer side surface of the optical element.

8. The electronic device of claim 1, wherein the reflection member comprises a curved area and is provided such that a concave surface is directed toward an inside of the optical element.

9. The electronic device of claim 8, wherein the curved area of the reflection member is formed in an another surface connection surface that connects the inner side surface and the outer side surface of the optical element.

10. The electronic device of claim 8, wherein the curved area of the reflection member is provided inside the other side of the optical element.

11. The electronic device of claim 1, wherein the reflection member is a retro-reflector element.

12. The electronic device of claim 11, wherein a reflective surface of the retro-reflector element comprises a flat surface and is vertical to the inner side surface and the outer side surface of the optical element.

13. The electronic device of claim 11, further comprising a diffraction element which is provided in one side of the optical element, and at which the image light incident from the optical driving assembly first arrives to diffract the arrived image light so that the image light is totally reflected between the inner side surface and the outer side surface of the optical element.

14. The electronic device of claim 13,
wherein the inner side surface and the outer side surface are parallel to each other, and
wherein one side connection surface, connecting the inner side surface and one side of the outer side surface, and an another side connection surface, connecting the inner side surface and another side of the outer side surface, are all vertical to the inner side surface or the outer side surface.

15. The electronic device of claim 1, further comprising an auxiliary reflection member which is provided in one side connection surface connecting the inner side surface and one side of the outer side surface, and at which the image light incident from the optical driving assembly first arrives to reflect the arrived image light so that the image light is totally reflected between the inner side surface and the outer side surface of the optical element.

16. The electronic device of claim 1, wherein the one side is located at a lengthwise end of the optical element and the another side is located at an opposite lengthwise end of the optical element.

17. The electronic device of claim 16, wherein the image light travels a length of the optical element from the point at which the image light is incident on the one side of the optical element to the point at which the image light is reflected by the reflection member.

18. The electronic device of claim 17, wherein the image light is reflected by the reflection member to return toward the point at which the image light is incident on the one side of the optical element.

* * * * *